US010936899B2

(12) United States Patent
Moloney et al.

(10) Patent No.: US 10,936,899 B2
(45) Date of Patent: Mar. 2, 2021

(54) METHODS, SYSTEMS AND APPARATUS TO IMPROVE IMAGE CLASSIFICATION WITH BOUNDARY-BITMAPS

(71) Applicant: Movidius Limited

(72) Inventors: David Moloney, Dublin (IE); Alireza Dehghani, Dublin (IE)

(73) Assignee: Movidius Limited

( * ) Notice: Subject to any disclaimer, the term of this patent is extended or adjusted under 35 U.S.C. 154(b) by 42 days.

(21) Appl. No.: 16/098,092

(22) PCT Filed: Jun. 6, 2017

(86) PCT No.: PCT/US2017/036174
§ 371 (c)(1),
(2) Date: Oct. 31, 2018

(87) PCT Pub. No.: WO2017/214164
PCT Pub. Date: Dec. 14, 2017

(65) Prior Publication Data
US 2019/0156141 A1  May 23, 2019

Related U.S. Application Data

(60) Provisional application No. 62/346,065, filed on Jun. 6, 2016.

(51) Int. Cl.
  *G06K 9/46* (2006.01)
  *G06K 9/32* (2006.01)
  (Continued)

(52) U.S. Cl.
  CPC ......... *G06K 9/4642* (2013.01); *G06K 9/3241* (2013.01); *G06K 9/38* (2013.01); *G06K 9/4609* (2013.01); *G06K 9/6269* (2013.01)

(58) Field of Classification Search
  CPC ....... G06K 9/3241; G06K 9/38; G06K 9/4609
  See application file for complete search history.

(56) References Cited

U.S. PATENT DOCUMENTS

| 9,697,463 B2 | 7/2017 | Ross et al. |
| 2009/0034793 A1 | 2/2009 | Dong et al. |

FOREIGN PATENT DOCUMENTS

| CN | 103400172 | 9/2016 |
| EP | 0999522 | 5/2000 |

OTHER PUBLICATIONS

M. S. Atkins and B. T. Mackiewich, "Fully automatic segmentation of the brain in MRI," in IEEE Transactions on Medical Imaging, vol. 17, No. 1, pp. 98-107, Feb. 1998. (Year: 1998).*
(Continued)

*Primary Examiner* — Ross Varndell
(74) *Attorney, Agent, or Firm* — Hanley, Flight & Zimmerman, LLC

(57) ABSTRACT

Methods, systems, apparatus and articles of manufacture are disclosed herein to improve image classification with boundary-bitmaps. An example disclosed apparatus includes a silhouette engine to identify a foreground silhouette within the image, generate a bounding box based on borders of the foreground silhouette, and generate an encoded silhouette matrix which identifies cells of a foreground and cells of a background, a convolution cell selector to convolve the encoded silhouette matrix to generate a convoluted bitmap matrix, and a filter cell selector to improve image classification efficiency by identifying eligible blocks of the convoluted bitmap matrix by retaining first respective cells of the convoluted bitmap matrix that satisfy a cell retention threshold, and removing second respective cells of the convoluted bitmap matrix that do not satisfy the cell retention threshold.

26 Claims, 14 Drawing Sheets

(51) Int. Cl.
G06K 9/38 (2006.01)
G06K 9/62 (2006.01)

(56) References Cited

OTHER PUBLICATIONS

D. Wu and L. Shao, "Silhouette Analysis-Based Action Recognition Via Exploiting Human Poses," in IEEE Transactions on Circuits and Systems for Video Technology, vol. 23, No. 2, pp. 236-243, Feb. 2013. (Year: 2013).*

Korean Patent Office, "Notice of Preliminary Rejection," mailed in connection with Korean Patent Application No. 2019-7000304, dated Mar. 25, 2020, 5 pages.

Schuster, "Pattern Recognition: Morphological Image Segmentation," 2003 Midyear Report, Oct. 20, 2003, 20 pages.

International Searching Authority, "International Search Report and Written Opinion," issued in connection with International Patent Application No. PCT/US2017/036174, dated Sep. 1, 2017, 17 pages.

Dollár et al. "Fast Feature Pyramids for Object Detection." Jan. 2014, 14 pages.

Pang et al. "Efficient HOG human detection." Sep. 2010, 9 pages.

Campbell et al. "Automatic Object Segmentation from Calibrated Images," 2011, 12 pages.

Chen et al. "Adaptive Silhouette Extraction and Human Tracking in Complex and Dynamic Environments," 2006, 4 pages.

Bouwmans. "Traditional and Recent Approaches in Background Modeling for Foreground Detection: An Overview," 2014, 73 pages.

Miezianko et al. "People Detection in Low Resolution Infrared Videos," 2008, 6 pages.

Dalal et al., "Histograms of Oriented Gradients for Human Detection," IEEE Computer Society Conference on Computer Vision and Pattern Recognition, 2005, 8 pages.

Stella Atkins et al., "Fully Automatic Segmentation of the Brain in MRI," IEEE Transactions on Medical Imaging, vol. 17, No. 1, Feb. 1998, 10 pages.

Zhu et al., "AverageExplorer: Interactive Exploration and Alignment of Visual Data Collections," Aug. 2014, 11 pages.

Dehghani et al., "Speed Improvement of Object Recognition Using Boundary-Bitmap of Histogram of Oriented Gradients," IEEE International Conference on Image, Vision and Computing, Aug. 3, 2016, 6 pages.

Korean Patent Office, "Notice of Allowance," mailed in connection with Korean Patent Application No. 2019-7000304, dated Oct. 27, 2020, 3 pages.

* cited by examiner

METHODS, SYSTEMS AND APPARATUS TO IMPROVE IMAGE CLASSIFICATION WITH BOUNDARY-BITMAPS

RELATED APPLICATIONS

This patent arises from a 371 nationalization of International Patent Application Serial No. PCT/US2017/036174, entitled "METHODS, SYSTEMS AND APPARATUS TO IMPROVE IMAGE CLASSIFICATION WITH BOUNDARY-BITMAPS," which claims the benefit of and priority from U.S. Provisional Application Ser. No. 62/346,065, entitled "Speed Improvement of Object Recognition Using Boundary-Bitmap of Histogram of Oriented Gradients" and filed on Jun. 6, 2016. International Patent Application Serial No. PCT/US2017/036174 and U.S. Provisional Application Ser. No. 62/346,065 are hereby incorporated by reference in their entireties.

FIELD OF THE DISCLOSURE

This disclosure relates generally to image classification, and, more particularly, to methods, systems and apparatus to improve image classification with boundary bitmaps.

BACKGROUND

In recent years, image classification has been achieved using different methods, including Histogram of Oriented Gradients (HoG) classifiers. Feature descriptors generated by example HoG classifiers are used in, for example, computer vision systems to detect humans, animals and/or objects in static images and/or videos. Generally speaking, classifiers are trained to detect such objects with the aid of learning systems, such as those that employ support vector machine (SVM) algorithms. As such, classification techniques are sometimes referred to as HoG/SVM classification systems.

The figures are not to scale.

DETAILED DESCRIPTION

Efforts to detect objects in images, videos and/or live video feeds (e.g., streaming video) is frequently accomplished with classifiers trained to detect such objects. In some examples, objects include human faces, human silhouettes, animals, vehicles, and/or other types of objects. In some examples, Histograms of Oriented Gradients (HoG) is applied with training images and a learning system to identify and/or otherwise classify objects. In some examples, the HoG is applied in connection with a support vector machine (SVM) to classify objects in images (referred to herein as HoG/SVM). An example of such an approach is described in "Histograms of oriented gradients for human detection," by Navneet Dalal and Bill Triggs, *International Conference on Computer Vision and Pattern Recognition (CVPR '05)*, June 2005, San Diego, United States, IEEE Computer Society, pp. 886-893, 2005, which is hereby incorporated by reference herein in its entirety.

As described in further detail below, the HoG/SVM evaluates a portion of a candidate image in a HoG detection window and calculates gradient values for each pixel within a particular cell, creates a histogram, manages binning, aggregates cell descriptors into block descriptors, and normalizes the block descriptors to be used with (fed into) the SVM classifier. Generally speaking, HoG facilitates feature extraction of candidate images to produce one or more combined feature vectors (HoG descriptors) that, when provided to a conventional SVM window classifier, facilitates object detection/recognition.

Figure 1:
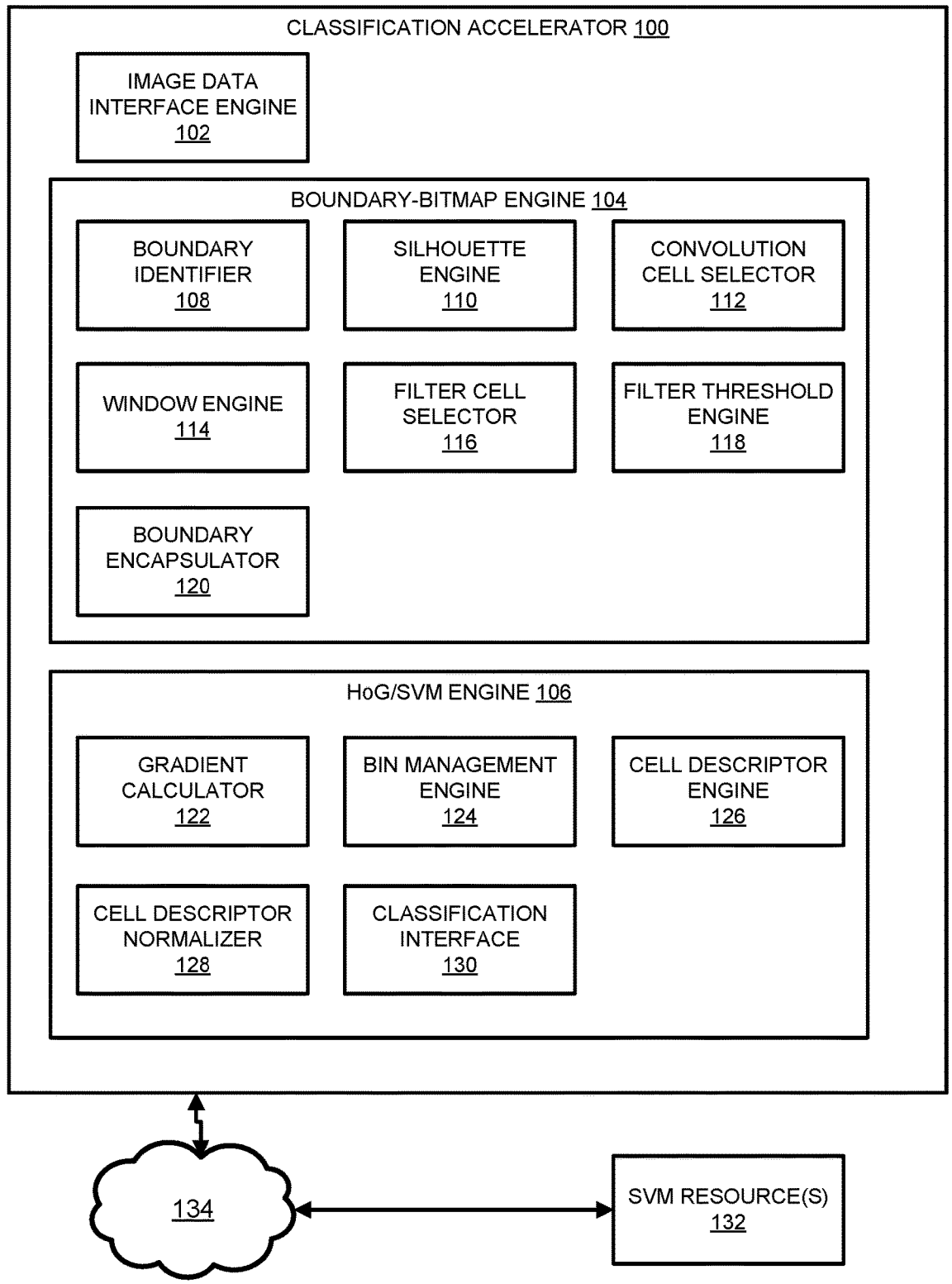
FIG. 1 is a schematic illustration of an example classification accelerator constructed in accordance with the teachings of this disclosure to improve image classification with boundary-bitmaps.

FIG. 1 illustrates an example classification accelerator 100 to improve image classification with boundary-bitmaps. In the illustrated example of FIG. 1, the classification accelerator 100 includes an image data interface 102, a boundary-bitmap engine 104, and a HoG/SVM engine 106. The example classification accelerator 100 is communicatively connected to one or more SVM resources 132 via a network 134. The example boundary-bitmap engine 104 includes an example boundary identifier 108, an example silhouette engine 110, an example convolution cell selector 112, an example window engine 114, an example filter cell selector 116, an example filter threshold engine 118, and an example boundary encapsulator 120. In the illustrated example of FIG. 1, the HoG/SVM engine 106 includes an example gradient calculator 122, an example bin management engine 124, an example cell descriptor engine 126, an example cell descriptor normalizer 128, and an example classification interface 130.

In response to the example image data interface engine 102 obtaining and/or otherwise retrieving a candidate image, the example gradient calculator 122 of the HoG/SVM engine 106 calculates gradient values (e.g., a magnitude gradient and an orientation gradient). In this example, the HoG/SVM engine 106 implements a means to calculate gradient values. However, equivalent structures may be used to implement the means to calculate gradient values. Generally speaking, local objects within the candidate image are characterized better by evaluating a distribution of local intensity gradients and/or edge directions. The magnitude of the gradient |G| is calculated by the example gradient calculator 122 in a manner consistent with example Equation 1.

$$|G|=|G_x|+|G_y|=|G_{x+1}-G_{x-1}|+|G_{y+1}-G_{y-1}|$$ Equation 1.

In the illustrated example of Equation 1, the magnitude of the gradient |G| is calculated according to the intensity values of adjacent pixels, and an orientation angle Θ is calculated by the example gradient calculator 122 in a manner consistent with example Equation 2.

$$\theta=\arctan(|G_{y+1}-G_{y-1}|/|G_{x+1}-G_{x-1}|)$$ Equation 2.

In the examples of Equations 1 and 2, the gradient calculator 122 implements a means to calculate the gradient and the orientation angle. However, equivalent structures may be used to implement the means to calculate the gradient and the orientation angle.

To illustrate, an example HoG/SVM process 200 is illustrated in FIG. 2A. In the illustrated example of FIG. 2A, the example image data interface engine 102 acquires a candidate image for analysis and selects a portion of that image as a HoG detection window 202. The example HoG detection window 202 of FIG. 2A is 64 pixels wide by 128 pixels high (by default, in this example), but other dimensions may alternatively be used. Each cell 204 of the example HoG detection window 202 in the example of FIG. 2A is an 2″×2″ (where n>0 and 2″<min window width/height) 8×8 grid of pixels, and the example gradient calculator 122 calculates the magnitudes and orientation values for the same, using, for example, the equations as described above.

To create a histogram, the example bin management engine 124 breaks up and/or otherwise assigns calculated orientation angles (Θ) into a target number of bins. In this example, the bin management engine 124 implements a means to assign, but equivalent structures may be used to implement the same. In the illustrated example of FIG. 2A, a range of 0° to 180° is broken into nine bins of 20° each by the example bin management engine 124. Additionally, the example bin management engine 124 adds each intensity value to respective bins associated with respective orientation angles to create an example HoG cell descriptor 206 (e.g., a histogram matching magnitudes to orientations). The example HoG cell descriptor 206 of FIG. 2A is represented as a histogram and includes nine (9) values, each having a minimum value of zero, and a maximum value of 128 times the maximum pixel intensity value. In this example, the bins represent orientation and the height of the bin(s) represent the magnitude of the corresponding orientation angle(s).

The example cell descriptor engine 126 aggregates all of the cell descriptors (histograms) 206 of a 2×2 block of cells 208. Note that because blocks of cells 208 are used by the cell descriptor engine 126, any HoG cell 204 that is not on an edge of the example HoG detection window 202 will appear in four different blocks of cells 208 such that corresponding cell descriptors 206 will be represented in four different block descriptors 210, as shown by the dashed arrows 209. For example, block 10 in FIG. 2B will appear in the following 2×2 grid in the aggregation of (a) 5, 6, 9, 10 (b) 6, 7, 10, 11 (c) 9, 10, 13, 14 and (d) 10, 11, 14 15. As described above, because local object appearance and shape is better characterized by a distribution of local gradients, local histograms for respective cells are accumulated in block descriptors and combined histogram entries form a representation. In this example, the cell descriptor engine 126 implements a means to aggregate, but equivalent structures may be used to implement the same.

To facilitate better invariance to illumination, shadowing, etc., block descriptors are normalized before being provided to an SVM for object recognition. In some examples, local histogram representations are accumulated over larger spatial regions (blocks) and are used to normalize all of the cells in such blocks. Normalized descriptor blocks are also referred to herein as HoG descriptors. Combining all such HoG descriptors of a corresponding HoG detection window 202 produces a combined feature vector (sometimes referred to herein as a complete HoG descriptor) that is ultimately provided to the SVM for detection.

The example cell descriptor normalizer 128 normalizes each block descriptor 210 having the cell descriptors 206 of the four HoG cells 204 therein. In this example, the cell descriptor normalizer 128 implements a means to normalize, but equivalent structures may be used to implement the same. Any type and/or number of normalization algorithm(s) may be applied by the example cell descriptor normalizer 128, such as those described in the aforementioned paper by Navneet Dalal and Bill Triggs. In the illustrated example of FIG. 2, normalized block descriptors 212 are shown for a corresponding block of cells 208. This includes a set of histogram data representing, in this example, 36 data elements per block (e.g., 9 bins with 4 cells in a block). The example cell descriptor normalizer 128 aggregates normalized block descriptors 212 for the example HoG detection window 202 to generate a complete HoG descriptor 214 (e.g., a combined feature vector) and, for the example 64 by 128 pixel window, includes 105 normalized blocks of histogram data. In particular, because the analysis of the block of cells occurs in a size of 2×2 blocks (overlapping), this repeats seven (7) times across the HoG detection window 202 and fifteen (15) times down the HoG detection window 202 (7×15=105). The example classification interface 130 feeds and/or otherwise provides the example complete HoG descriptor 214 to SVM resources 132 to perform classification. In some examples, the SVM resources use previously evaluated training images that are typically used in machine learning applications, such as the Inria® person image dataset and/or the Daimler® image dataset. In this example, the classification interface 130 implements a means to provide descriptors to SVM resources, but equivalent structures may be used to implement the same.

The aforementioned HoG computation is performed by repeatedly stepping through the example HoG detection window 202 for any number of portions of the candidate image. This stepping of a rectangular descriptor across a source image involves analyzing pixels that are not relevant to a matching task, which reflects wasted computational resources. Pixels that are irrelevant to a portion of an image containing an object to be detected are referred to herein as background pixels. On the other hand, pixels that are likely relevant to an object to be detected are referred to as foreground pixels. Generally speaking, the HoG computational cost to generate a complete HoG descriptor 214 (a combined feature vector) is high. For instance, for a 42 by 42 pixel candidate region of interest, approximately 11,500 addition operations, 1,300 multiplication, 5,200 division, 16 square root, and 5200 arctangent operations are required. Some of the wasted computational resources are applied to background pixels that are not part of the candidate image to be analyzed.

Figure 3:
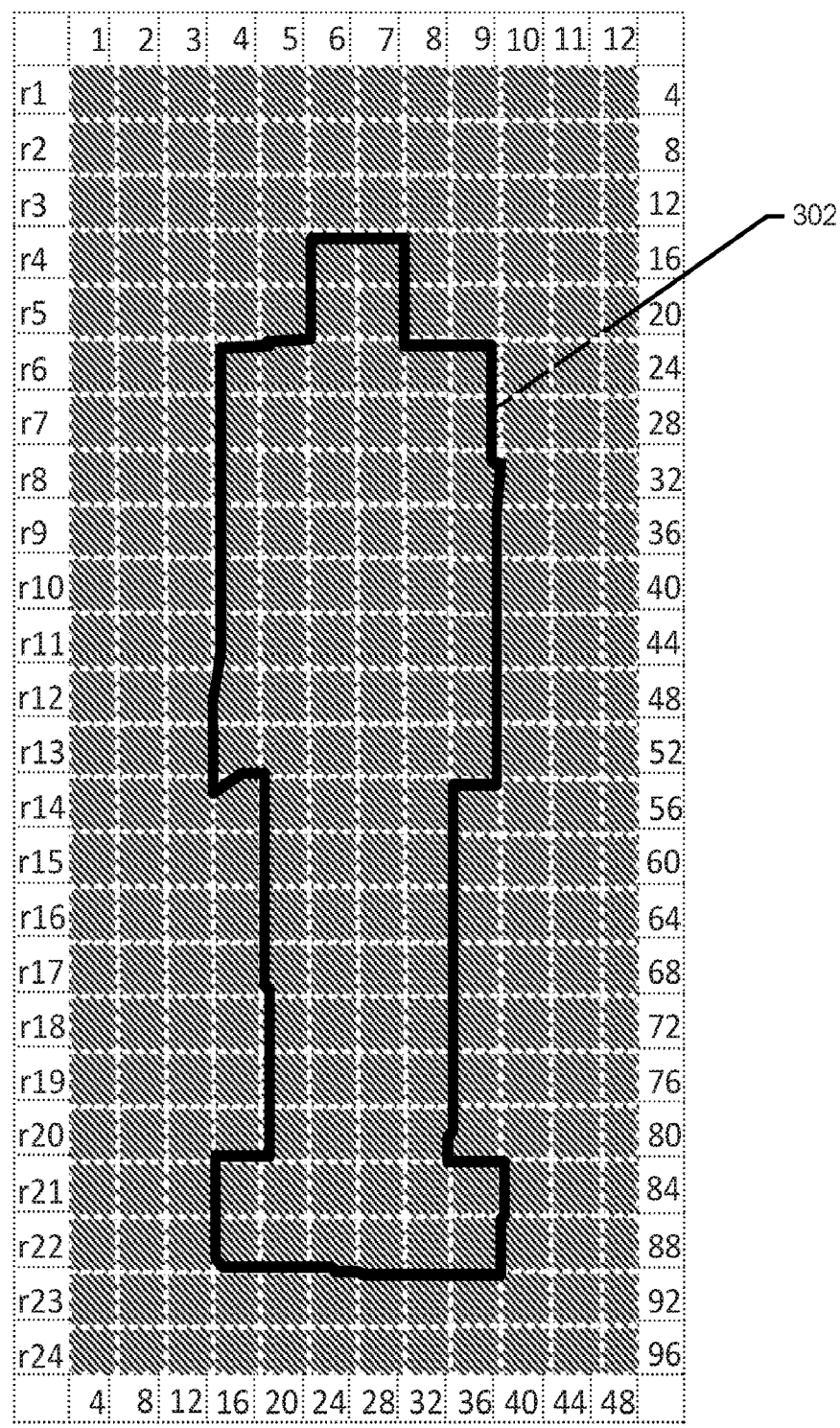
FIG. 3 is an illustration of an example silhouette window generated by the example classification accelerator of FIG. 1.

To improve an efficiency of the example HoG/SVM process, examples disclosed herein establish a bitmap to identify a subset of pixels in the example HoG detection window 202 to analyze. Examples disclosed herein establish and/or otherwise create bitmaps in a manner consistent with U.S. Pat. No. 9,639,777, entitled "Systems and Methods for Providing an Image Classifier," filed on Dec. 17, 2015, and granted on May 2, 2017, which is incorporated by reference herein in its entirety. To establish and/or otherwise create the bitmap, the example boundary identifier 108 and/or the example silhouette engine 110 first identifies a silhouette generated from training images applied to the image to be classified (a portion of the candidate image having a same size as the HoG detection window 202). In some examples, the boundary identifier 108 averages the candidate image in connection with the training images/dataset, and the example silhouette engine 110 applies thresholding to produce and/or otherwise calculate a silhouette window 300, as shown in FIG. 3. In this example, the boundary identifier 108 and the silhouette engine 110 implements a means to create a bitmap and/or a means to identify a silhouette, but equivalent structures may be used to implement the same. In the illustrated example of FIG. 3, an average of the INRIA® pedestrian detection image dataset is used to generate an example foreground silhouette 302. The example silhouette window 300 has a size of 48 by 96 pixels that are divided by the example boundary identifier 108 into 4 by 4 cells for a total of 288 cells (48/4 by 96/4=12 by 24=288 4 by 4 cells). Of the 288 cells in the illustrated example of FIG. 3, the example silhouette engine 110 identifies that 92 cells are included in the foreground silhouette 302, which represents 32% of the full area of the image.

In some examples, the silhouette engine 110 adds pixel intensity values together in each position with training images, and then divides the resulting values by the number of training images, as disclosed by Jun-Yan Zhu et al., "AverageExplorer: Interactive Exploration and Alignment of Visual Data Collections," ACM Transactions on Graphics, Vol. 33, No. 4, August 2014, which is incorporated by reference herein in its entirety. In some examples, MATLAB functions imadd( ) and imdivide( ) are used to perform these functions on a dataset and output the result to a bitmap file. The example foreground silhouette 302 is then generated by the example silhouette engine 110 as a result of the pixel-by-pixel averaging of the dataset, computer vision, and/or deep learning. The example foreground silhouette 302 is translated by the example silhouette engine 110 to form a HoG detection bitmap 402, as shown in FIG. 4.

Figure 2:
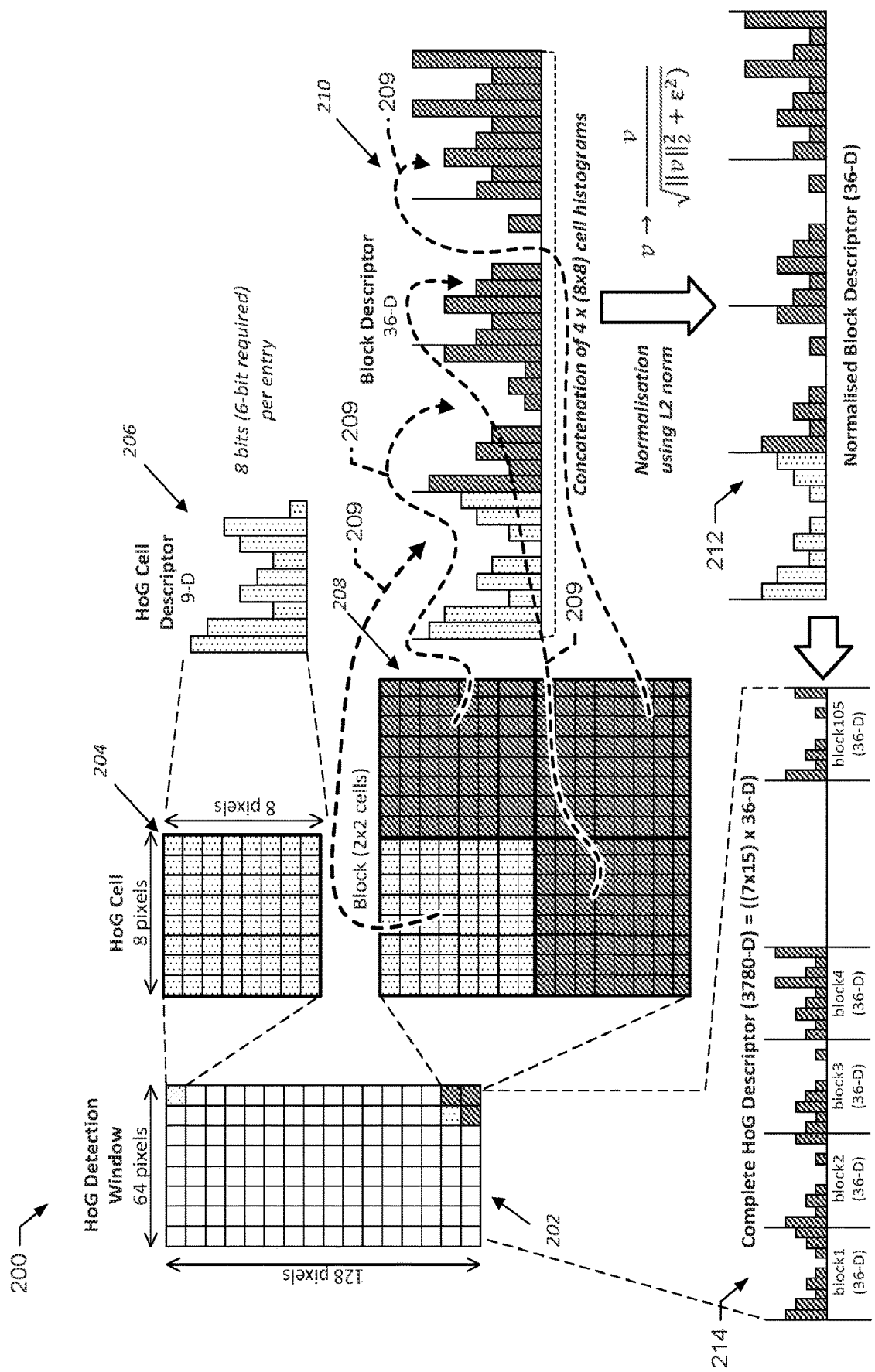
FIG. 2A is a schematic illustration of an example histogram of oriented gradients (HoG) process to generate descriptors for image classification implemented by the example classification accelerator of FIG. 1.
FIG. 2B is an illustration of an example grid.
Figure 2B:
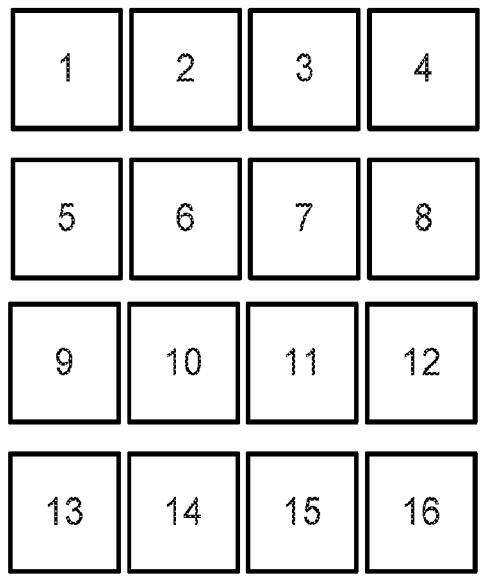
Figure 4:
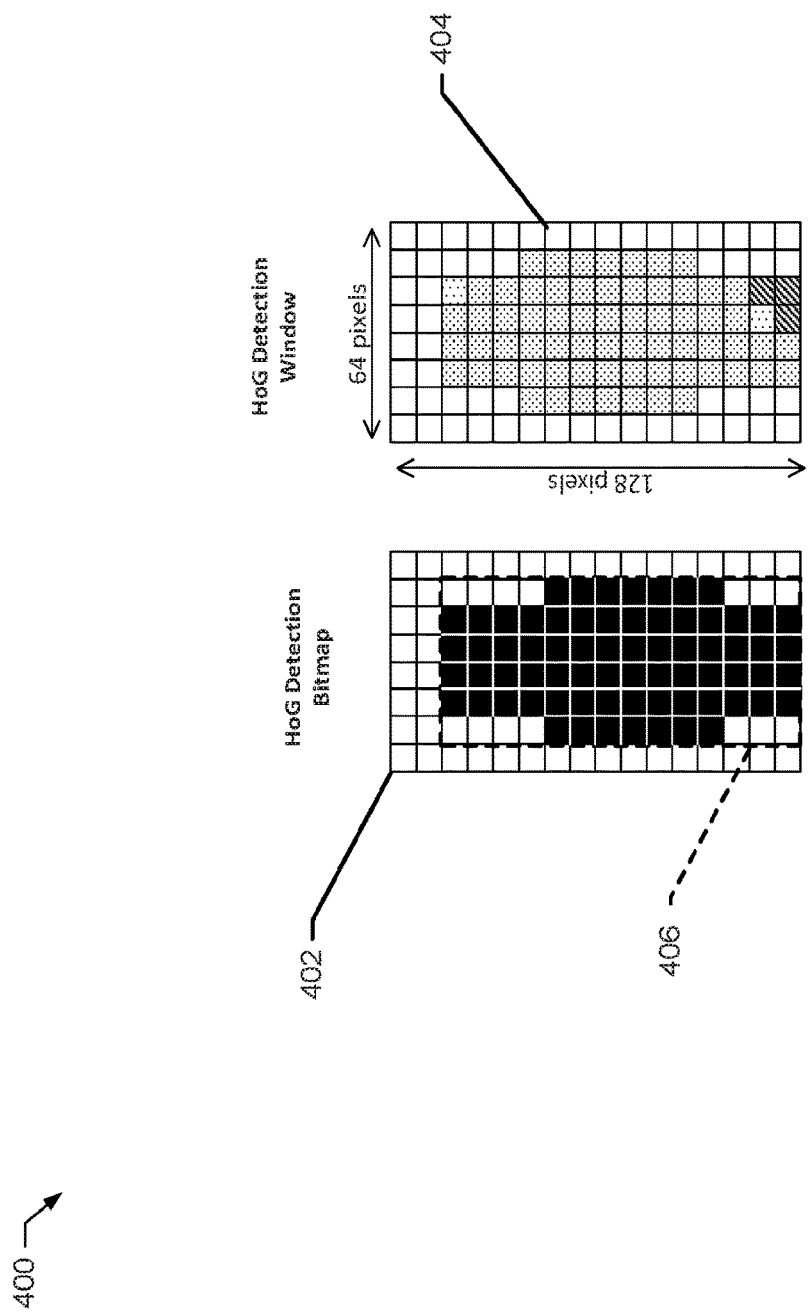
FIG. 4 is an illustration of an example HoG detection bitmap with a bounding-box to tailor an example HoG detection window during the HoG process of FIG. 2.

In the illustrated example of FIG. 4, the HoG detection bitmap 402 is shown next to a HoG detection window 404, similar to the example HoG detection window 202 of FIG. 2. In the illustrated example of FIG. 4, the HoG detection window 404 includes the candidate image to be analyzed. However, unlike the example HoG detection window 202 of FIG. 2, the HoG detection window 404 of FIG. 4 constrains the HoG/SVM process with a bounding-box 406 based on the example HoG detection bitmap 402 to process only those cells within the candidate image within the HoG detection window 404 to be classified that include foreground information of the example foreground silhouette 302. Stated differently, when the candidate image to be classified is overlaid with the HoG detection bitmap, both relevant pixels (foreground pixels) and non-relevant pixels (background pixels, e.g., pixels containing information related to scenes/objects unrelated to the silhouette) are scrutinized and the bounding-box 406 prevents unnecessary processing of such non-relevant pixels. In effect, rather than processing the entire number of cells in the example HoG detection window 404, the example silhouette engine 110 applies the example HoG detection bitmap 402 with the bounding-box 406 to tailor and/or otherwise constrain the HoG detection window 404 by reducing a number of cells and pixels to be analyzed, thereby permitting a lower number of orientation bins to be used, and reducing an overall size of resulting HoG descriptors, such as the example complete HoG descriptor 214 of FIG. 2. Accordingly, by comparing only the relevant portions of the candidate image to only the relevant portions of reference images, a significant reduction in process cost and complexity is achieved by examples disclosed herein.

However, while application of the example HoG detection bitmap 402 improves HoG/SVM efficiency by removing portions of a candidate image background, examples disclosed herein further improve computational efficiency by also removing portions of the foreground. In particular, examples disclosed herein remove portions of the foreground to allow representation and classification of objects within candidate images without substantial precision losses, as described in further detail below. Examples disclosed herein remove portions of the foreground in a manner that reduces power consumption on devices performing classification (e.g., mobile devices), and reduces bandwidth requirements of the devices performing classification. Additionally, examples disclosed herein reduce a size of the descriptor that is ultimately provided to the example SVM resources 132, which reduces a data transfer between one or more memories and one or more processors.

Figure 5:
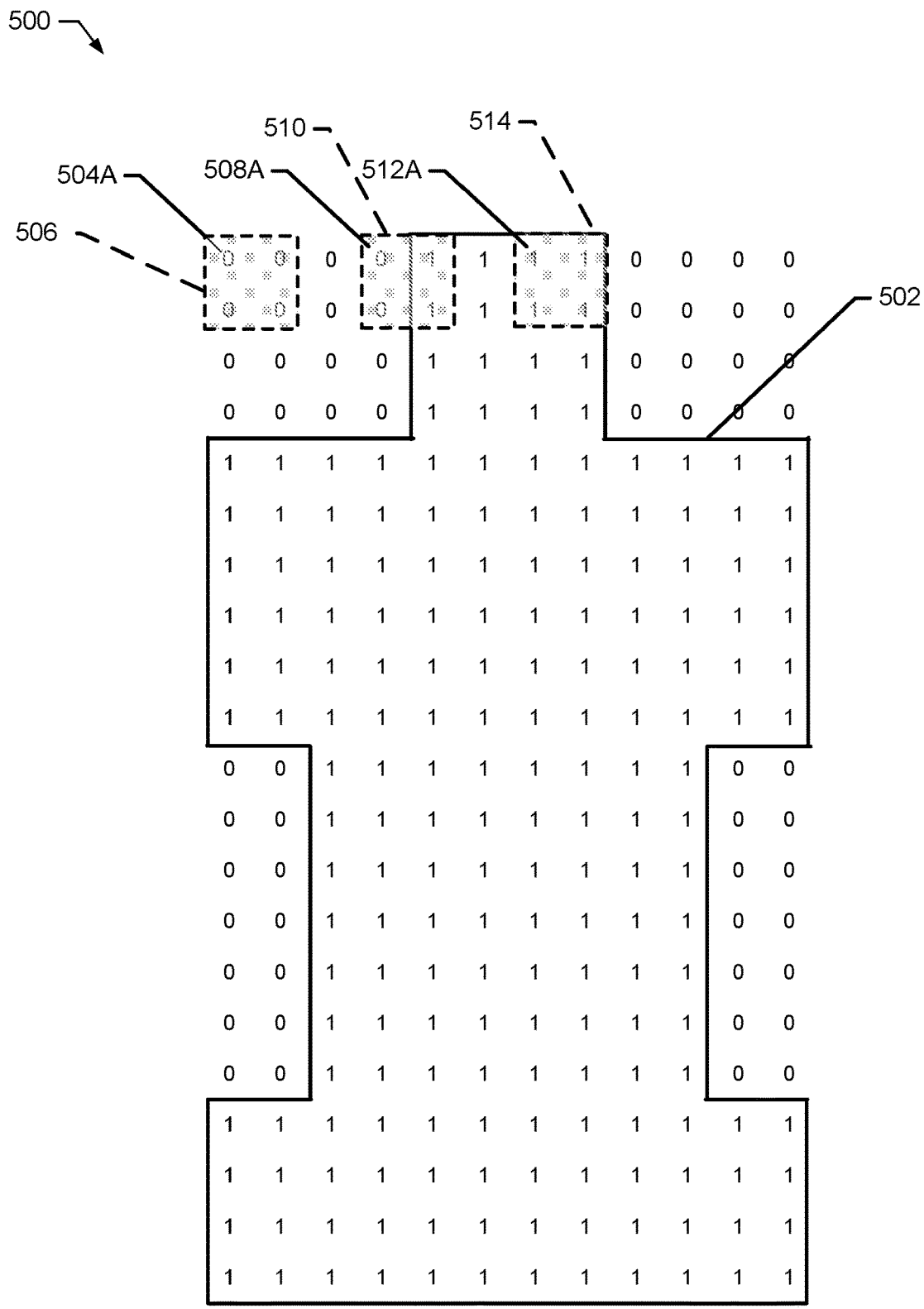
FIG. 5 is an illustration of an example encoded silhouette matrix generated by the example classification accelerator of FIG. 1.

FIG. 5 illustrates an example encoded silhouette matrix 500 generated by the example silhouette engine 110. In the illustrated example of FIG. 5, the silhouette engine 110 encoded background cells with a zero ("0") value and encoded foreground cells with a one ("1") value. Additionally, the example silhouette engine 110 identified a bitmap area 502 corresponding to transitional cells exhibit an adjacent change from a value of zero to one (and vice-versa), as shown by the solid line. As discussed above, while the silhouette engine 110 implements a means to generate an encoded silhouette matrix, and means to encode cells, other equivalent structures may be used to implement such means. The example bitmap area 502 generally resembles a silhouette of a human. As discussed above, the example encoded silhouette 500 enables substantial computational savings when it is applied to the example detection window to prevent unnecessary cells from being computed during the HoG/SVM process. In this example, the bitmap area 502 resembles the silhouette of a human. All of the cells interior to the example bitmap area 502 could be analyzed and/or otherwise calculated by the traditional HoG/SVM process. However, a substantial portion of the foreground cells are unnecessary for classification of the human object and, thus, analyzing all the cells in the area is wasteful of computational resources.

Figure 6:
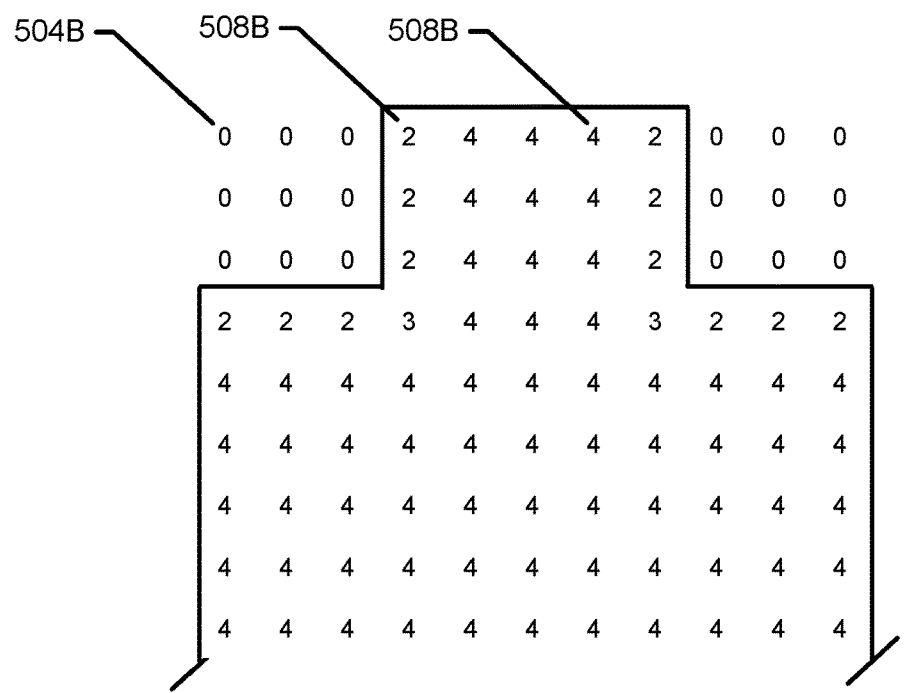
FIG. 6 is an illustration of an example convolved bitmap matrix generated by the example classification accelerator of FIG. 1.

To reduce a quantity of cells to be analyzed by the HoG/SVM process, the example convolution cell selector 112 of FIG. 1 convolves the example encoded silhouette 500 to generate a convolved bitmap matrix 600, as shown in FIG. 6. In this example, the convolution cell selector 112 implements a means to convolve, but other equivalent structures may be used to implement the means to convolve. Additionally, the example convolved bitmap matrix 600 is indicative of blocks inside the bitmap area 502. Each block includes a number of cells. Each cell includes a number of pixels, as described above. However, some cells of the example encoded silhouette 500 do not include any blocks indicative of foreground pixels, some cells may include only a partial block indicative of foreground pixels (e.g., less than four cells of a block, but greater than one cell of the block), and some cells may be completely within the foreground (e.g., four cells per block). Accordingly, particular cells are better candidates to keep for further analysis as being relevant to the classification process. In the illustrated example of FIG. 5, the convolution cell selector selects one cell at a time (e.g., starting with a top-left cell 504A). The example window engine 114 convolves the selected cell with a ones matrix kernel 506, and in the illustrated example of FIG. 5, the ones matrix kernel 506 is a 2×2 kernel (e.g., one block containing four cells). In this example, the window engine 114 implements a means to convolve with a kernel, but other equivalent structures may be used to implement the means to convolve with a kernel. Additionally, the example window engine 114 counts a quantity of foreground cells that, as described above, have a value of 1 for foreground cells and a value of 0 for background cells. In the illustrated example of FIG. 5, the first selected cell 504A does not include any foreground cells within the ones matrix kernel 506, and a resulting count equals zero. The example convolution cell selector 112 writes this calculated value (e.g., 0) to the example convolved bitmap matrix 600 in its corresponding cell location 504B (see FIG. 6).

To illustrate further, consider a second cell 508A selected by the example convolution cell selector 112. The example window engine 114 convolves the selected cell with another 2×2 matrix kernel 510, and the example window engine 114 counts a quantity of two (2) foreground cells. In other words, only a portion of a block (e.g., block our cells) is represented by the example second cell 508A. As such, the example convolution cell selector 112 writes this calculated sum (e.g., 2) to the example convolved bitmap matrix 600 in its corresponding cell location 508B (see FIG. 6).

To illustrate further, consider a third cell 512A selected by the example convolution cell selector 112. The example window engine 114 convolves the selected cell with another 2×2 matrix kernel 514, and the example window engine 114 counts a quantity of four (4) foreground cells. As such, the example convolution cell selector 112 writes this calculated sum (e.g., 4) to the example convolved bitmap matrix 600 in its corresponding cell location 512B (see FIG. 6).

Figure 7:
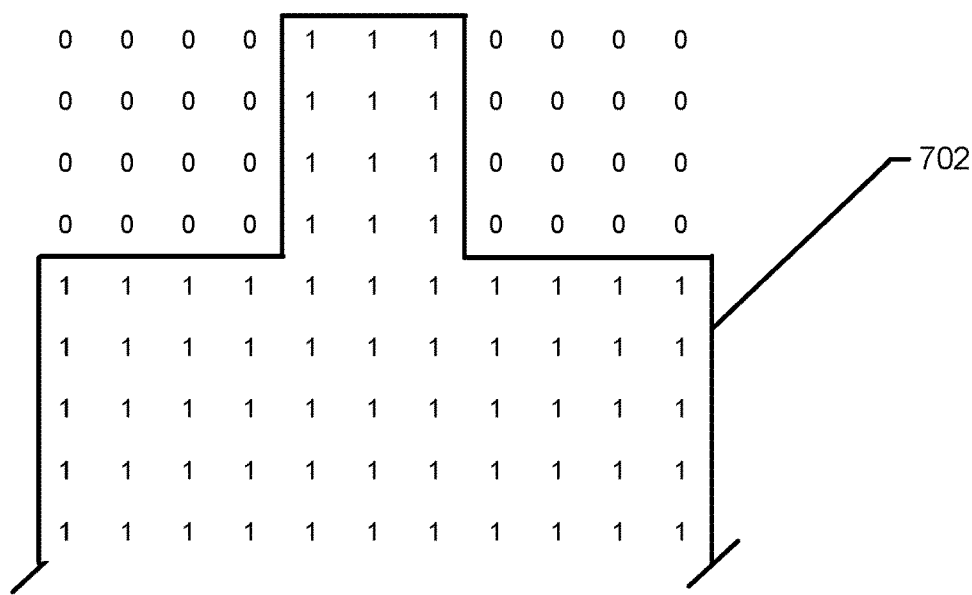
FIG. 7 is an illustration of an example contributed blocks (CB) matrix generated by the example classification accelerator of FIG. 1.

In the illustrated example of FIG. 6, the convolved bitmap matrix 600 includes summed values between zero (0) and four (4) that are based on the particular kernel size and block overlap size. To identify which blocks (groups of cells) should contribute to a HoG/SVM process, the example filter cell selector 116 selects a cell, and the example filter threshold engine 118 evaluates that cell against a cell retention threshold value. In this example, the filter cell selector 116 implements a means to select a cell, but other equivalent structures may be used to implement the means to select a cell. Additionally, in this example the filter threshold engine 118 implements a means to evaluate a cell, but other equivalent structures may be used to implement the means to evaluate a cell. In the illustrated example of FIG. 6, the filter threshold engine 118 applies a filter value of four (4) and, if the cell satisfies the cell retention threshold, the example filter cell selector 116 retains the respective cell by writing/encoding a retention indicator (e.g., a value of one (1)) in the corresponding matrix cell, otherwise the example filter cell selector 116 removes the respective cell (from consideration) by writing/encoding a discard indicator (e.g., a value of zero (0)) to the corresponding matrix cell. FIG. 7 illustrates an example contributed blocks (CB) matrix 700 that results from the aforementioned filtering and encoding.

Stated differently, the example CB matrix 700 is encoded to identify the eligible foreground blocks/cells. While the illustrated example of FIG. 7 identifies a value of one (1) for the retention indicator and a value of zero (0) for the discard indicator, other examples may use any retention and/or discard indicator representations.

Figure 8:
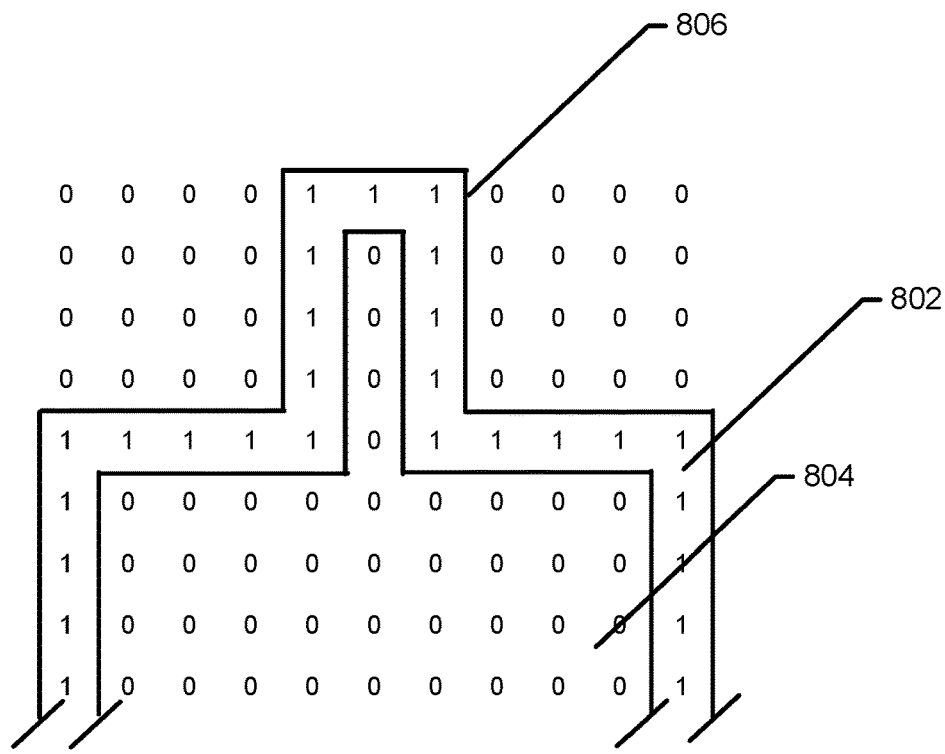
FIG. 8 is an illustration of an example eligible block matrix generated by the example classification accelerator of FIG. 1.

However, to identify only contributed blocks of a boundary 702 (an edge of the CB matrix 700), the example boundary encapsulator 120 identifies a boundary-bitmap area (e.g., an outer edge/perimeter of cells) 806 containing retention indicators (e.g., a value of one (1)) 802 and replaces discard indicators (e.g., all other cells with a value of zero (0)) 804, as shown in FIG. 8. In this example, the boundary encapsulator 120 implements a means to identify a boundary-bitmap area, but other equivalent structures may be used to implement the means to identify a boundary-bitmap area. In the illustrated example of FIG. 8, an eligible block matrix 800 is shown that identifies the boundary-bitmap area 806 of the CB matrix. The example eligible block matrix 800 is encoded to prevent the HoG/SVM from processing or calculating foreground cells that are not necessary for object classification (e.g., eligible cells are encoded with a one (1) and ineligible cells are encoded with a zero (0)). The example classification interface 130 applies the example eligible block matrix 800 to a HoG detection window, such as the example HoG detection window 202 of FIG. 2, to constrain and/or otherwise reduce a number of cells to be computed during the HoG/SVM classification process. In some examples, the classification interface 130 performs a masking operation on the HoG detection window in connection with the applied eligible block matrix 800 such that only the overlapping cells containing respective retention indicators will be used during the HoG/SVM classification process. As such, computational resources for HoG/SVM processing are drastically reduced, thereby achieving power conservation and memory utilization reduction for devices (e.g., embedded devices, mobile devices, etc.).

As described above, the complete HoG descriptor generated by examples disclosed herein, such as the example complete HoG descriptor 214, have an improved length (e.g., shorter). As a result, when the complete HoG descriptor is provided to SVM resources 132 for classification processes, such SVM resources 132 may exhibit computational improvements, as well. In some examples, detection results calculated by the example SVM resources 132 are faster in view of examples disclosed herein.

In some examples, images from different datasets have different sizes, so a fixed size bounding box may not provide adequate accuracy. To address this scaling circumstance, scaling factors may be applied in view of the bounding box and associated boundary-bitmap area. An example x-dimension scaling factor ($S_x$) and an example y-dimension scaling factor ($S_y$) are shown as example Equations 3 and 4, respectively.

$$S_x = \frac{NI_x}{RI_x}. \qquad \text{Equation 3}$$

$$S_y = \frac{NI_y}{RI_y}. \qquad \text{Equation 4}$$

In the illustrated examples of Equations 3 and 4, NI represents a new image (e.g., from an INRIA dataset) and RI represents a reference image (e.g., from a Daimler dataset). For example, if a size of a reference image is 96×48 and a size of a new image is 134×70, then a corresponding scaling factor (S) in x and y directions are:

$$S_x = \frac{70}{48} = 1.458, S_y = \frac{134}{96} = 1.395$$

In some examples, despite the scaling of the bounding box and boundary-bitmap, corresponding sizes may be regulated by rounding up or down to be an integer multiple of the cell size. In the event scaling causes vertices of a bitmap pattern polygon to be displaced inside cells rather than occurring on the corner of cells, the example boundary-bitmap engine 104 rounds any vertex of the bitmap polygon to the closest vertex of cell that it falls in.

While an example manner of implementing the classification accelerator 100 of FIG. 1 is illustrated in FIGS. 2-8, one or more of the elements, processes and/or devices illustrated in FIG. 1 may be combined, divided, re-arranged, omitted, eliminated and/or implemented in any other way. Further, the example image data interface engine 102, the example boundary-bitmap engine 104, the example boundary identifier 108, the example silhouette engine 110, the example convolution cell selector 112, the example window engine 114, the example filter cell selector 116, the example filter threshold engine 118, the example boundary encapsulator 120, the example Hog/SVM engine 106, the example gradient calculator 122, the example bin management engine 124, the example cell descriptor engine 126, the example cell descriptor normalizer 128, the example classification interface 130 and/or, more generally, the example classification accelerator 100 of FIG. 1 may be implemented by hardware, software, firmware and/or any combination of hardware, software and/or firmware. Thus, for example, any of the example image data interface engine 102, the example boundary-bitmap engine 104, the example boundary identifier 108, the example silhouette engine 110, the example convolution cell selector 112, the example window engine 114, the example filter cell selector 116, the example filter threshold engine 118, the example boundary encapsulator 120, the example Hog/SVM engine 106, the example gradient calculator 122, the example bin management engine 124, the example cell descriptor engine 126, the example cell descriptor normalizer 128, the example classification interface 130 and/or, more generally, the example classification accelerator 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image data interface engine 102, the example boundary-bitmap engine 104, the example boundary identifier 108, the example silhouette engine 110, the example convolution cell selector 112, the example window engine 114, the example filter cell selector 116, the example filter threshold engine 118, the example boundary encapsulator 120, the example Hog/SVM engine 106, the example gradient calculator 122, the example bin management engine 124, the example cell descriptor engine 126, the example cell descriptor normalizer 128, the example classification interface 130 and/or, more generally, the example classification accelerator 100 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example classification accelerator 100 of FIG. 1 may include one or more elements, processes and/or devices in addition to, or instead of, those illustrated in FIGS. 1-8, and/or may include more than one of any or all of the illustrated elements, processes and devices.

Flowcharts representative of example machine readable instructions for implementing the classification accelerator 100 of FIG. 1 are shown in FIGS. 9-12. In these examples, the machine readable instructions comprise a program for execution by a processor such as the processor 1312 shown in the example processor platform 1300 discussed below in connection with FIG. 13. The program(s) may be embodied in software stored on a non-transitory computer readable storage medium such as a CD-ROM, a floppy disk, a hard drive, a digital versatile disk (DVD), a Blu-ray disk, or a memory associated with the processor 1312, but the entire program(s) and/or parts thereof could alternatively be executed by a device other than the processor 1312 and/or embodied in firmware or dedicated hardware. Further, although the example programs are described with reference to the flowcharts illustrated in FIGS. 9-12, many other methods of implementing the example classification accelerator 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 9:
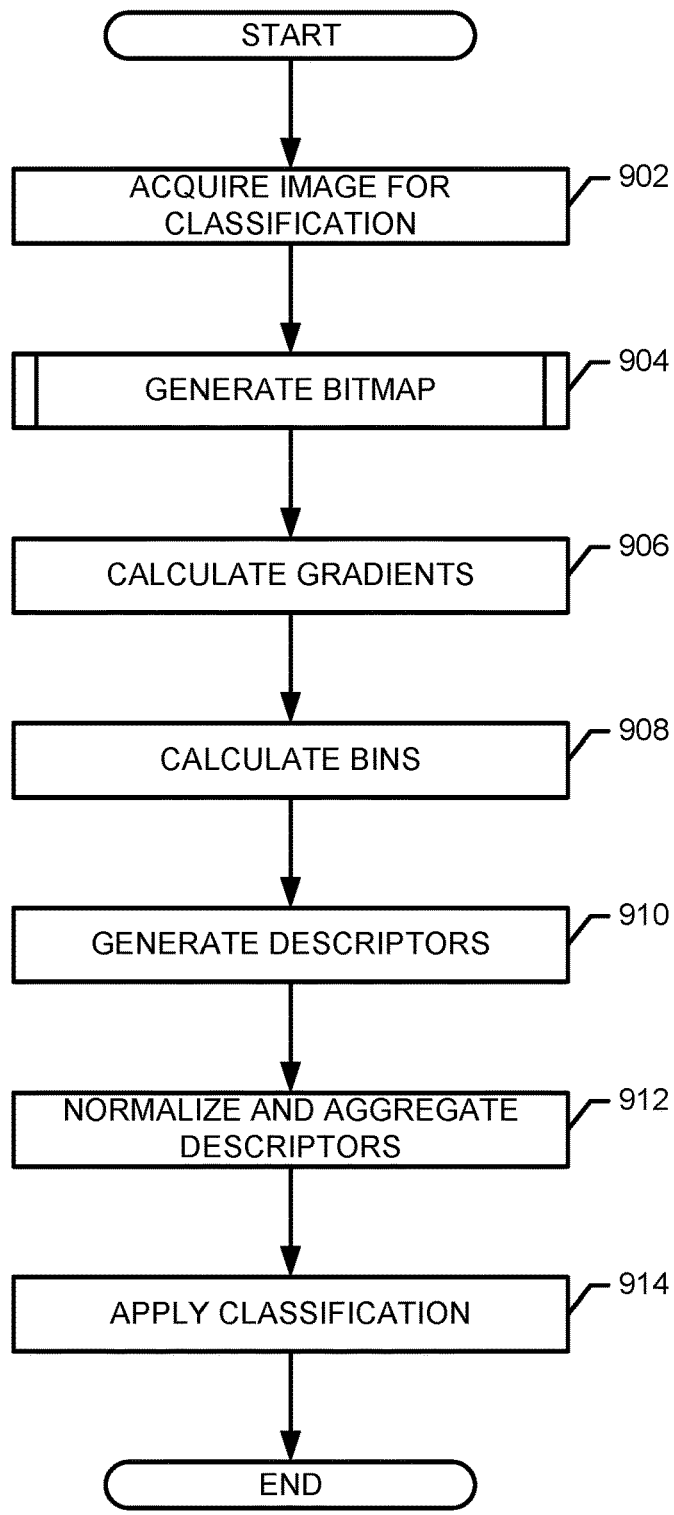
FIGS. 9-12 are flowcharts representative of example machine readable instructions that may be executed to implement the example classification accelerator of FIG. 1 to improve image classification with boundary-bitmaps.

The program 900 of FIG. 9 begins at block 902, where the example image data interface engine 102 acquires, receives and/or otherwise retrieves an image for classification. While traditional approaches to classify one or more objects within the retrieved image include immediate application of a HoG/SVM process, examples disclosed herein intercept initiation of the HoG/SVM classification process by first generating a boundary-bitmap such that any subsequent HoG/SVM classification process operates in an improved manner (e.g., improved computational efficiency, lower memory demand(s), lower power consumption, etc.). The example boundary bitmap engine 104 generates a boundary-bitmap (block 904) to facilitate an improved manner of HoG/SVM classification, as discussed above and in further detail below.

In response to generating the bitmap, which tailors and/or otherwise reduces a number of pixels to be analyzed by a HoG/SVM classification process, the example gradient calculator 122 calculates gradient values for cells 204 of the example HoG detection window 202 (block 906). Additionally, the example bin management engine 124 calculates corresponding bins based on calculated orientation angles (block 908). Examples disclosed above and in connection with FIG. 2 illustrated bins of 20° each, but examples disclosed herein are not limited thereto. Accumulated intensity values for corresponding bins allows the example bin management engine 124 to generate HoG cell descriptors (histograms), such as the example cell descriptor 206 of FIG. 2. The example cell descriptor engine 126 aggregates cell descriptors 206 to generate block descriptors, such as the example block descriptor 210 of FIG. 2 (block 910).

Example block descriptors 210 are normalized by the example cell descriptor normalizer 128 (block 912). In some examples, the cell descriptor normalizer 128 applies an L2 norm. The example normalization performed by the cell descriptor normalizer 128 produces a normalized block descriptor, such as the example normalized block descriptor 212 of FIG. 2. Additionally, the example cell descriptor normalizer 128 aggregates respective normalized block descriptors (block 912) as the HoG detection window is strided through its respective cells, which produces an example complete HoG descriptor, such as the example complete HoG descriptor 214 of FIG. 2. The example classification interface 130 forwards, transmits and/or otherwise provides the example complete HoG descriptor 214 to an SVM classifier (block 914), such as the example SVM resources 132 of FIG. 1 to facilitate classification (object recognition).

Figure 10:
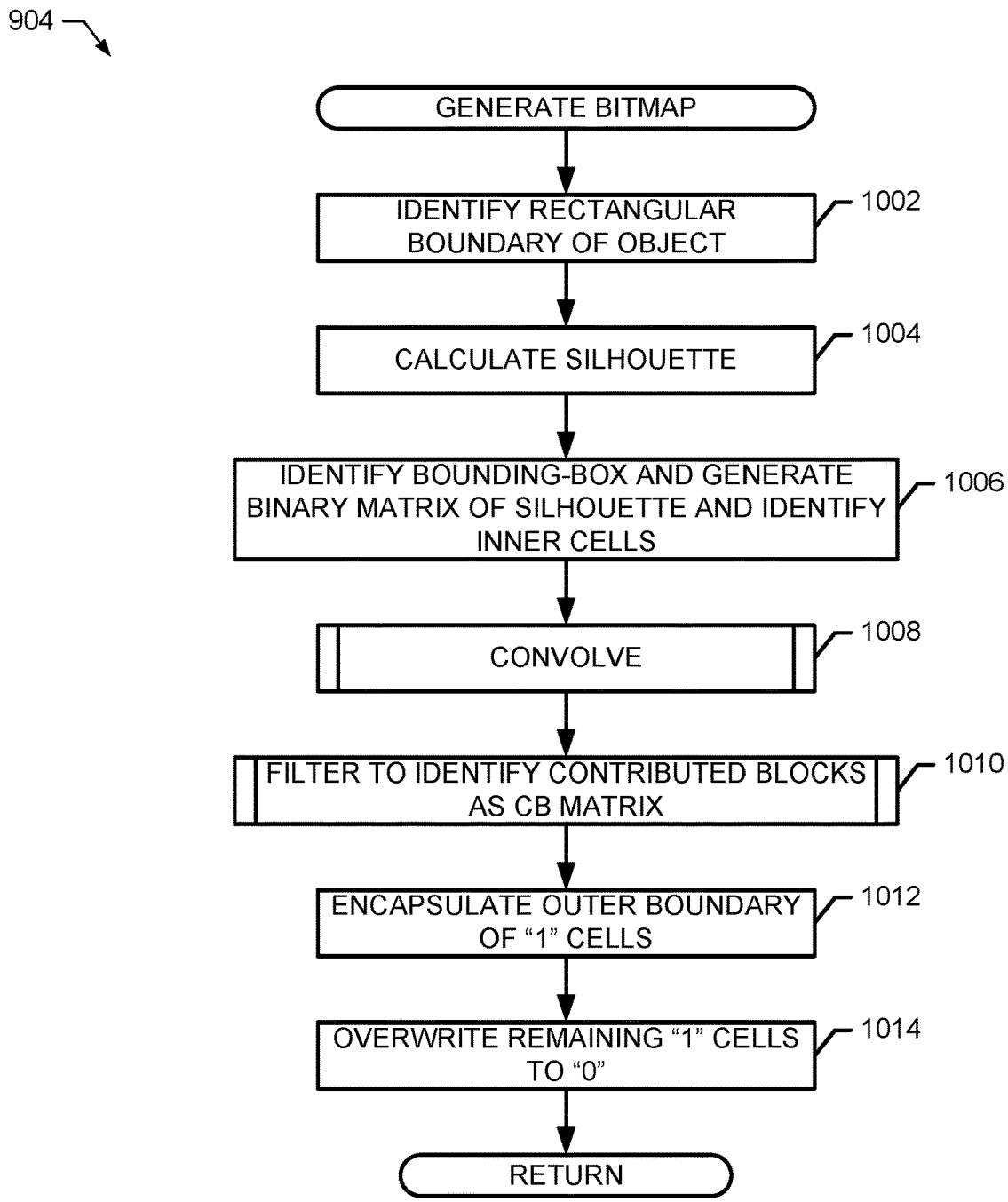

FIG. 10 includes additional detail associated with generating the bitmap (block 1002) of FIG. 9. In the illustrated example of FIG. 10, the example boundary identifier 108 identifies a rectangular boundary of an object in the selected image, such as the silhouette window 300 shown in FIG. 3. The example silhouette engine 110 identifies and/or otherwise calculates a foreground silhouette 302 within the example silhouette window 300 (block 1004). The example silhouette engine 110 also generates and/or otherwise identifies a corresponding bounding box (e.g., the example bounding box 406 of FIG. 4), and generates a binary matrix of the silhouette to identify and/or otherwise reveal whether the bounding box also includes some background cells (block 1006). In some examples, the silhouette engine 110 generates the bounding box (area) based on borders of the silhouette, which removes portions of background cells of the example rectangular boundary (silhouette window 300). An example binary matrix generated by the example silhouette engine 110 is shown in FIG. 5, in which cells that are outside the foreground silhouette 302 are encoded with a zero (0), and cells that are inside the foreground silhouette 302 are encoded with a one (1).

Figure 11:
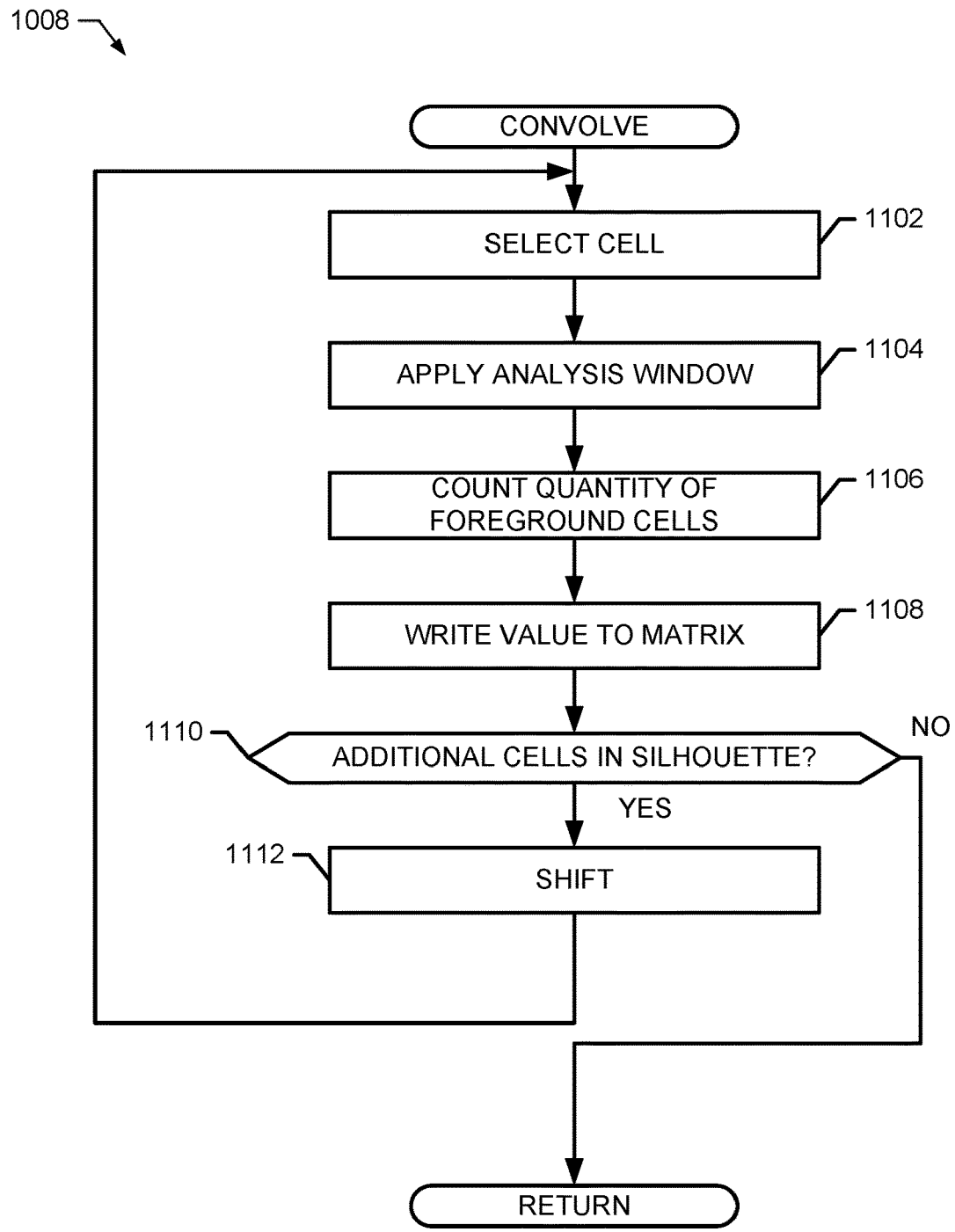

To identify a bitmap area, such as the example bitmap area 502 of FIG. 5 that only includes foreground cells therein, the example classification accelerator 100 invokes the example convolution cell selector 112 to convolve the encoded silhouette (block 1008). FIG. 11 illustrates additional detail associated with convolving (block 1008). In the illustrated example of FIG. 11, the example convolution cell selector 112 selects a first cell from the example encoded silhouette matrix 500 (block 1102). The example window engine 114 applies an analysis window to the selected first cell (block 1104). As described above, the analysis window may be a ones matrix kernel, such as the example ones matrix 506 of FIG. 5, which is a 2×2 kernel. The example window engine 114 counts a quantity of foreground cells within the applied matrix (block 1106), which in the illustrated example of FIG. 5 for the first selected cell 504A does not include any foreground cells. As such, the example window engine 114 calculates a sum total of zero, in this example. The example convolution cell selector 112 writes this sum value to a convolved bitmap matrix (block 1108), such as the example convolved bitmap matrix 600 of FIG. 6, in its corresponding cell location. If the example convolution cell selector 112 determines that there are additional cells to analyze in the example encoded silhouette 500 (block 1110), then the convolution cell selector shifts and/or otherwise strides to the next available cell (e.g., stride to the right cell-by-cell, then wrap-around to a new row and continue left-to-right striding/selection), and control returns to block 1102. On the other hand, if the example convolution cell selector 112 determines that all cells of the example encoded silhouette 500 have been convolved (block 1110), then the example program (block 1108) exits and control returns to block 1010 of FIG. 10.

As discussed above in connection with FIGS. 5 and 6 to generate the example convolved bitmap matrix 600, summed values between zero (0) and four (4) result based on the particular kernel size and overlap stride selected, but examples disclosed herein are not limited thereto. The example convolved bitmap matrix 600 of FIG. 6 illustrates those cells that are candidates for the HoG/SVM classification process, in which all background cells are now removed from consideration by identifying a zero (0) value therein. However, to further narrow a selection of cells that should contribute to the classification via application of HoG/SVM, the example filter cell selector 116 filters the example convolved bitmap matrix 600 to identify candidate contributed blocks therein (block 1010).

Figure 12:
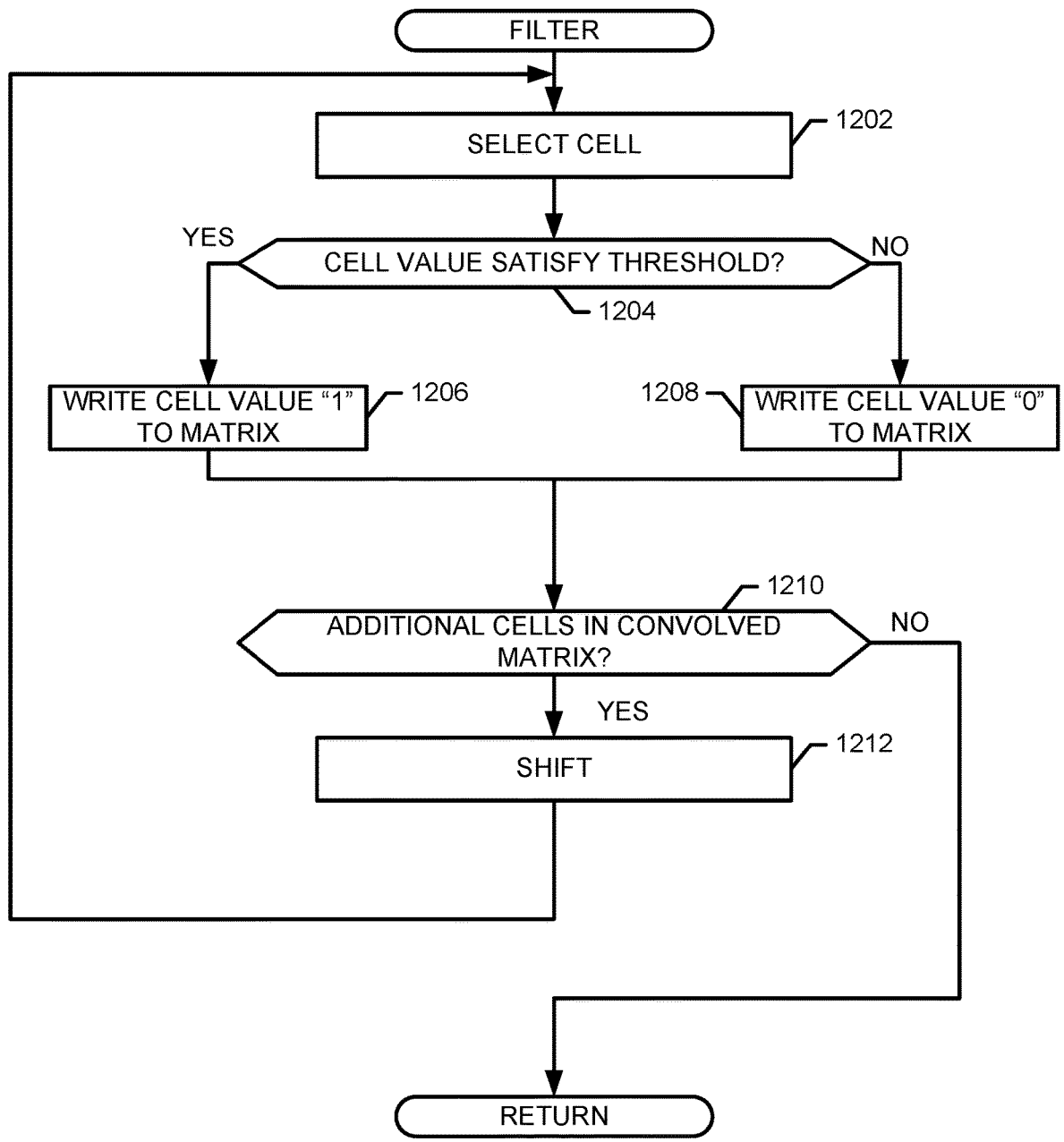

FIG. 12 illustrates additional details associated with filtering of block 1010. In the illustrated example of FIG. 12, the example filter cell selector 116 selects a cell from the convolved bitmap matrix 600 (block 1202). The example filter threshold engine 118 compares a value of the selected cell to a threshold value (block 1204). In this example, the threshold value is four (4), and if the cell value satisfies this threshold test, the example filter cell selector 116 writes a cell value of one (1) to a respective cell of an example contributed blocks (CB) matrix (block 1206), such as the example CB matrix 700 of FIG. 7. On the other hand, if the example filter threshold engine 118 determines that the cell value does not satisfy the threshold test (e.g., the value is less than four (4)), then the example filter cell selector 116 writes a cell value of zero (0) to the respective cell of the example CB matrix (block 1208). The example filter cell selector 116 determines whether the example convolved bitmap matrix 600 includes additional cells to test/analyze against the threshold (block 1210), and if there are remaining cells to analyze, the example filter cell selector 116 shifts and/or otherwise strides to a next available cell within the example convolved bitmap matrix 600 (block 1212), and control returns to block 1202. Otherwise, the example program of block 1010 exits and control returns to block 1012 of FIG. 10.

As a result of the aforementioned filtering of block 1010, the example CB matrix 700 is generated to identify only those cells that are sufficient to facilitate classification via HoG/SVM (eligible foreground blocks). However, some of the inner foreground cells are capable of being removed without sacrificing classification accuracy. The example boundary encapsulator 120 encapsulates and/or otherwise identifies an outer boundary of cells having a value of one (1) (block 1012), and overwrites any other cells that are not part of the outer boundary with a value of zero (0) (block 1014). As a result, an eligible block matrix 800 is generated by the boundary encapsulator 120 to constrain, guide and/or otherwise mask a HoG detection window during the HoG/SVM classification process to reduce a number of cells to be analyzed for classification efforts.

Figure 13:
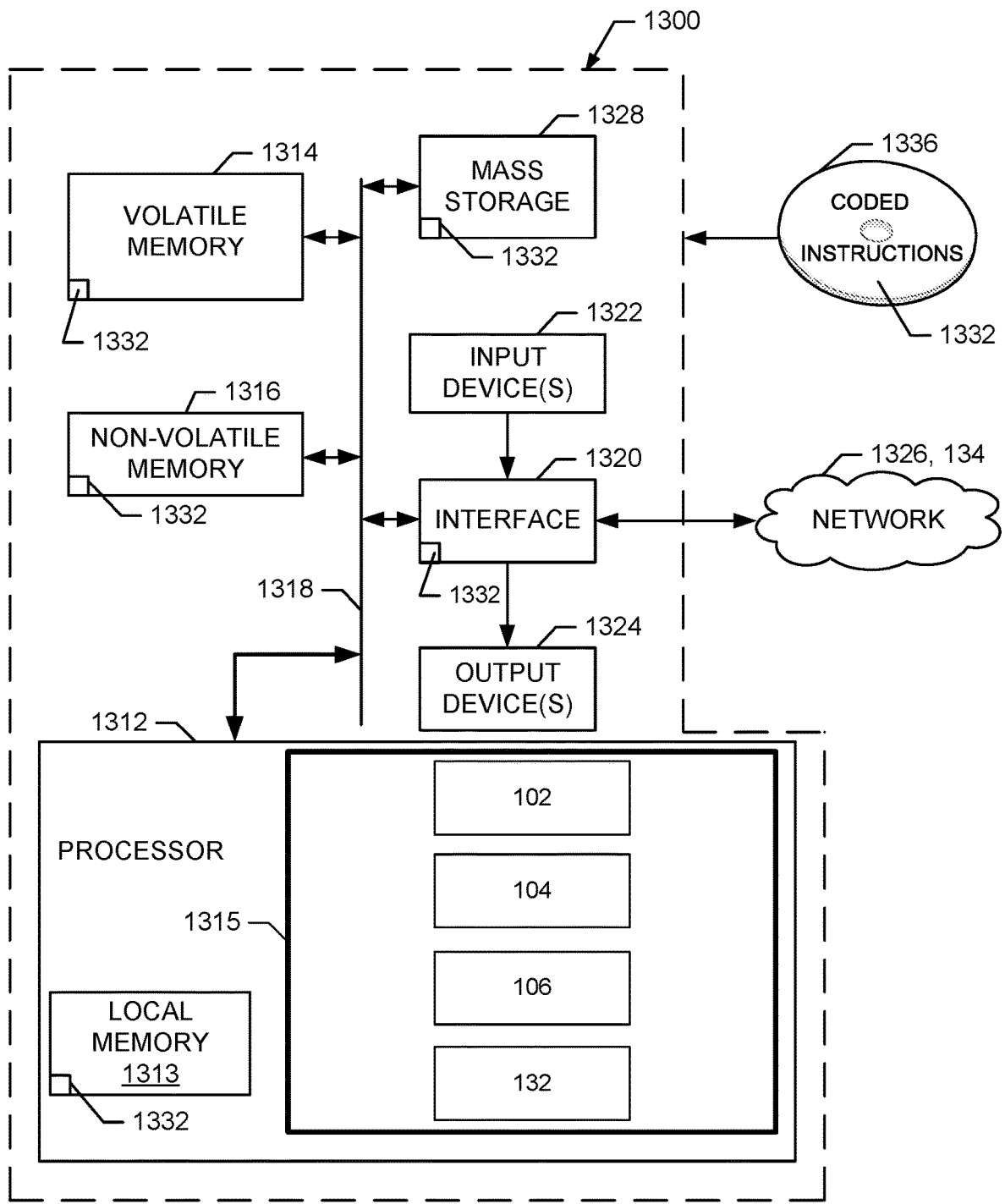
FIG. 13 is a block diagram of an example processor platform structured to execute the example machine readable instructions of FIGS. 9-12 to implement the example classification accelerator of FIG. 1.

FIG. 13 is a block diagram of an example processor platform 1300 capable of executing the instructions of FIGS. 9-12 to implement the example classification accelerator 100 of FIG. 1. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, an embedded device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor 1312 implements the example image data interface engine 102, the example boundary-bitmap engine 104, the example HoG/SVM engine 106 and, in some examples, the example SVM resources 132. In the illustrated example of FIG. 15, the processor 1312 includes one or more example processing cores 1315 configured via example instructions 1332, which include the example instructions of FIGS. 9-12.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 9-12 may be stored in the mass storage device 1328, in the volatile memory 1314, in the non-volatile memory 1316, and/or on a removable tangible computer readable storage medium such as a CD or DVD.

Examples disclosed herein may apply to internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing, image classification (e.g., still image, streaming video, etc.), or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone, embedded device, or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

Backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices, such as over the backbone links, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, image classification, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

Clusters of IoT devices may be equipped to communicate with other IoT devices as well as with a cloud network. This may allow the IoT devices to form an ad-hoc network between the devices, allowing them to function as a single device, which may be termed a fog device.

A cloud computing network in communication with a mesh network of IoT devices may operate as a fog device at the edge of the cloud computing network. The mesh network of IoT devices may be termed a fog, operating at the edge of the cloud.

The fog may be considered to be a massively interconnected network wherein a number of IoT devices are in communications with each other, for example, by radio links. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices include gateways, data aggregators, and sensors, although any combinations of IoT devices and functionality may be used. The gateways may be edge devices that provide communications between the cloud and the fog, and may also provide the backend process function for data obtained from sensors, such as motion data, flow data, temperature data, and the like. The data aggregators may collect data from any number of the sensors, and perform the back end processing function for the analysis. The results, raw data, or both may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along a convenient path (e.g., a most convenient path) between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog provided from these IoT devices may be presented to devices in the cloud, such as a server, as a single device located at the edge of the cloud, e.g., a fog device. In this example, the alerts coming from the fog device may be sent without being identified as coming from a specific IoT device within the fog. In this fashion, the fog may be considered a distributed platform that provides computing and storage resources to perform processing or data-intensive tasks such as data analytics, data aggregation, and machine-learning, among others.

In some examples, the IoT devices may be configured using an imperative programming style, e.g., with each IoT device having a specific function and communication partners. However, the IoT devices forming the fog device may be configured in a declarative programming style, allowing the IoT devices to reconfigure their operations and communications, such as to determine needed resources in response to conditions, queries, and device failures. As an example, a query from a user located at a server about the operations of a subset of equipment monitored by the IoT devices may result in the fog device selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from flow sensors or temperature sensors. Further, if some of the IoT devices are not operational, other IoT devices in the fog device may provide analogous data, if available.

From the foregoing, it will be appreciated that example methods, apparatus, systems and articles of manufacture have been disclosed that improve image classification efforts. Traditional approaches of the HoG/SVM classification process have brought substantial improvements to image classification and recognition efforts. However, such traditional approaches impose computational loads on processing devices. Such loads may be too stringent, particularly for embedded devices that do not enjoy the relatively abundant memory, bandwidth and/or power availability of desktop platforms and servers. Because the traditional HoG/SVM classification process performs detection through repeatedly stepping a HoG window across a test image, corresponding computational costs increase as test image sizes, resolutions and scaling adjustments increase.

As such, examples disclosed herein reduce computational burdens by removing both background cells and foreground cells of images that require object detection. In some examples, bitmaps are applied to HoG detection windows to mask and/or otherwise tailor the HoG detection window to feed only those internal cells needed for successful classification of objects within the test image. Such reductions to the input of the HoG/SVM classification process cause a corresponding reduction in a number of image pixels/cells/blocks to be analyzed, a reduction in a number of HoG cell descriptors to be calculated, a reduction in a number of block descriptors to be generated, a reduction in an amount of normalization computations to be performed on the block descriptors, and a reduction in the number of aggregated/completed HoG descriptors to be fed into an SVM.

Example methods, systems and apparatus to improve image classification with boundary-bitmaps are disclosed herein. Some such examples and combinations thereof include the following.

Example 1 is an apparatus to analyze an image, the apparatus including a silhouette engine to identify a foreground silhouette within the image, generate a bounding box based on borders of the foreground silhouette; and generate an encoded silhouette matrix to identify cells of a foreground and cells of a background, a convolution cell selector to convolve the encoded silhouette matrix to generate a convoluted bitmap matrix, and a filter cell selector to improve image classification efficiency by identifying eligible blocks of the convoluted bitmap matrix by retaining first respective cells of the convoluted bitmap matrix that satisfy a cell retention threshold, and removing second respective cells of the convoluted bitmap matrix that do not satisfy the cell retention threshold.

Example 2 includes the apparatus as defined in example 1, wherein the filter cell selector is to generate a contributed blocks matrix by encoding the first respective cells of the contributed blocks matrix with a retention indicator, and encoding the second respective cells of the contributed blocks matrix with a discard indicator.

Example 3 includes the apparatus as defined in example 2, further including a boundary encapsulator to identify an outer perimeter of respective ones of the retention indicator to generate an eligible block matrix.

Example 4 includes the apparatus as defined in example 3, further including a classification interface to mask a detection window with the eligible block matrix, the mask to reduce a number of blocks to be processed in image classification.

Example 5 includes the apparatus as defined in example 1, further including a classification interface to provide the retained first respective cells of the convoluted bitmap matrix to a histogram of oriented gradients classifier.

Example 6 includes the apparatus as defined in claim 1, further including a window engine to convolve a ones matrix kernel to respective cells of the encoded silhouette; and calculate a sum total of foreground cells within the ones matrix kernel for the respective cells of the encoded silhouette.

Example 7 includes the apparatus as defined in claim 6, wherein the convolution cell selector is to encode the convoluted bitmap matrix with the sum total in respective cells of the convoluted bitmap matrix.

Example 8 includes the apparatus as defined in claim 1, wherein the cell retention threshold includes a value based on at least one of a matrix kernel size or an overlap step size.

Example 9 includes the apparatus as defined in any one of examples 2, 5, 6 or 8, further including a bin management engine to assign orientation angles of the image to form a histogram of image magnitudes.

Example 10 includes the apparatus as defined in any one of examples 2, 5, 6, or 8, further including a cell descriptor engine to aggregate histograms of image cells to respective blocks of the image.

Example 11 includes the apparatus as defined in any one of examples 2, 5, 6 or 8, further including a boundary encapsulator to identify a boundary-bitmap area of the image, the boundary-bitmap area indicative of a reduced number of image cells to participate in image classification.

Example 12 is a method to analyze an image, the method including identifying, by executing an instruction with a processor, a foreground silhouette within the image, generating, by executing an instruction with the processor, a bounding box based on borders of the foreground silhouette, generating, by executing an instruction with the processor, an encoded silhouette matrix to identify cells of a foreground and cells of a background, convolving, by executing an instruction with the processor, the encoded silhouette matrix to generate a convoluted bitmap matrix, improving image classification efficiency by identifying, by executing an instruction with the processor, eligible blocks of the convoluted bitmap matrix by (a) retaining first respective cells of the convoluted bitmap matrix that satisfy a cell retention threshold, and (b) remove second respective cells of the convoluted bitmap matrix that do not satisfy the cell retention threshold.

Example 13 includes the method as defined in example 12, further including generating a contributed blocks matrix by encoding the first respective cells of the contributed blocks matrix with a retention indicator, and encoding the second respective cells of the contributed blocks matrix with a discard indicator.

Example 14 includes the method as defined in example 13, further including identifying an outer perimeter of respective ones of the retention indicator to generate an eligible block matrix.

Example 15 includes the method as defined in claim 14, further including masking a detection window with the eligible block matrix, the mask to reduce a number of blocks to be processed in image classification.

Example 16 includes the method as defined in example 12, further including providing the retained first respective cells of the convoluted bitmap matrix to a histogram of oriented gradients classifier.

Example 17 includes the method as defined in example 12, further including convolving a ones matrix kernel to respective cells of the encoded silhouette, and calculating a sum total of foreground cells within the ones matrix kernel for the respective cells of the encoded silhouette.

Example 18 includes the method as defined in example 17, further including encoding the convoluted bitmap matrix with the sum total in respective cells of the convoluted bitmap matrix.

Example 19 includes the method as defined in example 12, further including setting a value of the cell retention threshold based on at least one of a matrix kernel size or an overlap step size.

Example 20 includes the method as defined in any one of examples 13, 16, 17 or 19, further including assigning orientation angles of the image to form a histogram of image magnitudes.

Example 21 includes the method as defined in any one of examples 13, 16, 17 or 19, further including aggregating histograms of image cells to respective blocks of the image.

Example 22 includes the method as defined in any one of examples 13, 16, 17 or 19, further including identifying a boundary-bitmap area of the image, the boundary-bitmap area indicative of a reduced number of image cells to participate in image classification.

Example 23 is a tangible computer-readable medium comprising instructions that, when executed, cause a processor to, at least identify a foreground silhouette within an image, generate a bounding box based on borders of the foreground silhouette, generate an encoded silhouette matrix to identify cells of a foreground and cells of a background, convolve the encoded silhouette matrix to generate a convoluted bitmap matrix, improve image classification efficiency by identifying eligible blocks of the convoluted bitmap matrix by (a) retaining first respective cells of the convoluted bitmap matrix that satisfy a cell retention threshold, and (b) remove second respective cells of the convoluted bitmap matrix that do not satisfy the cell retention threshold.

Example 24 includes the computer-readable medium as defined in example 23, wherein the instructions, when executed, further cause the processor to generate a contributed blocks matrix by encoding the first respective cells of the contributed blocks matrix with a retention indicator, and encoding the second respective cells of the contributed blocks matrix with a discard indicator.

Example 25 includes the computer-readable medium as defined in example 24, wherein the instructions, when executed, further cause the processor to identify an outer perimeter of respective ones of the retention indicator to generate an eligible block matrix.

Example 26 includes the computer-readable medium as defined in example 25, wherein the instructions, when executed, further cause the processor to mask a detection window with the eligible block matrix, the mask to reduce a number of blocks to be processed in image classification.

Example 27 includes the computer-readable medium as defined in example 23, wherein the instructions, when executed, further cause the processor to provide the retained first respective cells of the convoluted bitmap matrix to a histogram of oriented gradients classifier.

Example 28 includes the computer-readable medium as defined in example 23, wherein the instructions, when executed, further cause the processor to convolve a ones matrix kernel to respective cells of the encoded silhouette, and calculate a sum total of foreground cells within the ones matrix kernel for the respective cells of the encoded silhouette.

Example 29 includes the computer-readable medium as defined in example 28, wherein the instructions, when executed, further cause the processor to encode the convoluted bitmap matrix with the sum total in respective cells of the convoluted bitmap matrix.

Example 30 includes the computer-readable medium as defined in example 23, wherein the instructions, when executed, further cause the processor to set a value of the cell retention threshold based on at least one of a matrix kernel size or an overlap step size.

Example 31 includes the computer-readable medium as defined in any one of examples 24, 27, 28 or 30, wherein the instructions, when executed, further cause the processor to assign orientation angles of the image to form a histogram of image magnitudes.

Example 32 includes the computer-readable medium as defined in any one of examples 24, 27, 28 or 30, wherein the instructions, when executed, further cause the processor to aggregate histograms of image cells to respective blocks of the image.

Example 33 includes the computer-readable medium as defined in any one of examples 24, 27, 28 or 30, wherein the instructions, when executed, further cause the processor to identify a boundary-bitmap area of the image, the boundary-bitmap area indicative of a reduced number of image cells to participate in image classification.

Example 34 is a system to analyze an image, the system including means for identifying a foreground silhouette within the image, means for generating a bounding box based on borders of the foreground silhouette, means for generating an encoded silhouette matrix to identify cells of a foreground and cells of a background, means for convolving the encoded silhouette matrix to generate a convoluted bitmap matrix, means for improving image classification efficiency by identifying eligible blocks of the convoluted bitmap matrix by (a) retaining first respective cells of the convoluted bitmap matrix that satisfy a cell retention threshold, and (b) remove second respective cells of the convoluted bitmap matrix that do not satisfy the cell retention threshold.

Example 35 includes the system as defined in example 34, further including means for generating a contributed blocks matrix by encoding the first respective cells of the contributed blocks matrix with a retention indicator, and encoding the second respective cells of the contributed blocks matrix with a discard indicator.

Example 36 includes the system as defined in example 35, further including means for identifying an outer perimeter of respective ones of the retention indicator to generate an eligible block matrix.

Example 37 includes the system as defined in example 36, further including means for masking a detection window with the eligible block matrix, the mask to reduce a number of blocks to be processed in image classification.

Example 38 includes the system as defined in example 34, further including means for providing the retained first respective cells of the convoluted bitmap matrix to a histogram of oriented gradients classifier.

Example 39 includes the system as defined in claim 34, further including means for convolving a ones matrix kernel to respective cells of the encoded silhouette, and calculating a sum total of foreground cells within the ones matrix kernel for the respective cells of the encoded silhouette.

Example 40 includes the system as defined in example 39, further including means for encoding the convoluted bitmap matrix with the sum total in respective cells of the convoluted bitmap matrix.

Example 41 includes the system as defined in example 34, further including means for setting a value of the cell retention threshold based on at least one of a matrix kernel size or an overlap step size.

Example 42 includes the system as defined in any one of examples 35, 38, 39 or 41, further including means for assigning orientation angles of the image to form a histogram of image magnitudes.

Example 43 includes the system as defined in any one of examples 35, 38, 39 or 41, further including means for aggregating histograms of image cells to respective blocks of the image.

Example 44 includes the system as defined in any one of examples 35, 38, 39 or 41, further including means for identifying a boundary-bitmap area of the image, the boundary-bitmap area indicative of a reduced number of image cells to participate in image classification.

Example 45 includes the system as defined in example 34, wherein the means for identifying a foreground silhouette includes a silhouette engine.

Example 46 includes the example as defined in example 34, wherein the means for generating a bounding box includes a silhouette engine.

Example 47 includes the system as defined in example 34, wherein the means for generating an encoded silhouette matrix includes a silhouette engine.

Example 48 includes the system as defined in example 34, wherein the means for convolving the encoded silhouette matrix includes a convolution cell selector.

Example 49 includes the system as defined in example 34, wherein the means for improving image classification efficiency by identifying eligible blocks includes a filter cell selector.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to analyze an image, the apparatus comprising:
   a silhouette engine to:
   identify a foreground silhouette within the image;
   generate a bounding box based on borders of the foreground silhouette; and
   generate an encoded silhouette matrix which identifies cells of a foreground and cells of a background;
   a convolution cell selector to convolve the encoded silhouette matrix to generate a convoluted bitmap matrix; and
   a filter cell selector to improve image classification efficiency by identifying eligible blocks of the convoluted bitmap matrix by:
   retaining first respective cells of the convoluted bitmap matrix that satisfy a cell retention threshold;
   removing second respective cells of the convoluted bitmap matrix that do not satisfy the cell retention threshold; and
   a classification interface to provide the retained first respective cells of the convoluted bitmap matrix to a histogram of oriented gradients classifier.

2. The apparatus as defined in claim 1, wherein the filter cell selector is to generate a contributed blocks matrix by encoding the first respective cells of the contributed blocks matrix with a retention indicator, and encoding the second respective cells of the contributed blocks matrix with a discard indicator.

3. The apparatus as defined in claim 2, further including a boundary encapsulator to identify an outer perimeter of respective ones of the retention indicator to generate an eligible block matrix.

4. The apparatus as defined in claim 3, further including a classification interface to mask a detection window with the eligible block matrix, the mask to reduce a number of blocks to be processed in image classification.

5. The apparatus as defined in claim 1, further including a window engine to:
   convolve a ones matrix kernel to respective cells of the encoded silhouette; and
   calculate a sum total of foreground cells within the ones matrix kernel for the respective cells of the encoded silhouette.

6. The apparatus as defined in claim 5, wherein the convolution cell selector is to encode the convoluted bitmap matrix with the sum total in respective cells of the convoluted bitmap matrix.

7. The apparatus as defined in claim 1, wherein the cell retention threshold includes a value based on at least one of a matrix kernel size or an overlap step size.

8. A method to analyze an image, the method comprising:
   identifying, by executing an instruction with a processor, a foreground silhouette within the image;
   generating, by executing an instruction with the processor, a bounding box based on borders of the foreground silhouette;
   generating, by executing an instruction with the processor, an encoded silhouette matrix to identify cells of a foreground and cells of a background;
   convolving, by executing an instruction with the processor, the encoded silhouette matrix to generate a convoluted bitmap matrix;
   improving image classification efficiency by identifying, by executing an instruction with the processor, eligible blocks of the convoluted bitmap matrix by (a) retaining first respective cells of the convoluted bitmap matrix that satisfy a cell retention threshold, and (b) remove second respective cells of the convoluted bitmap matrix that do not satisfy the cell retention threshold; and
   transmitting the retained first respective cells of the convoluted bitmap matrix to a histogram of oriented gradients classifier.

9. The method as defined in claim 8, further including generating a contributed blocks matrix by encoding the first respective cells of the contributed blocks matrix with a retention indicator, and encoding the second respective cells of the contributed blocks matrix with a discard indicator.

10. The method as defined in claim 9, further including identifying an outer perimeter of respective ones of the retention indicator to generate an eligible block matrix.

11. The method as defined in claim 10, further including masking a detection window with the eligible block matrix, the mask to reduce a number of blocks to be processed in image classification.

12. The method as defined in claim 8, further including:
convolving a ones matrix kernel to respective cells of the encoded silhouette; and
calculating a sum total of foreground cells within the ones matrix kernel for the respective cells of the encoded silhouette.

13. The method as defined in claim 12, further including encoding the convoluted bitmap matrix with the sum total in respective cells of the convoluted bitmap matrix.

14. The method as defined in claim 8, further including setting a value of the cell retention threshold based on at least one of a matrix kernel size or an overlap step size.

15. A tangible computer-readable medium comprising instructions that, when executed, cause a processor to, at least:
identify a foreground silhouette within an image;
generate a bounding box based on borders of the foreground silhouette;
generate an encoded silhouette matrix to identify cells of a foreground and cells of a background;
convolve the encoded silhouette matrix to generate a convoluted bitmap matrix;
improve image classification efficiency by identifying eligible blocks of the convoluted bitmap matrix by (a) retaining first respective cells of the convoluted bitmap matrix that satisfy a cell retention threshold, and (b) remove second respective cells of the convoluted bitmap matrix that do not satisfy the cell retention threshold; and
forward the retained first respective cells of the convoluted bitmap matrix to a histogram of oriented gradients classifier.

16. The computer-readable medium as defined in claim 15, wherein the instructions, when executed, further cause the processor to generate a contributed blocks matrix by encoding the first respective cells of the contributed blocks matrix with a retention indicator, and encoding the second respective cells of the contributed blocks matrix with a discard indicator.

17. The computer-readable medium as defined in claim 16, wherein the instructions, when executed, further cause the processor to identify an outer perimeter of respective ones of the retention indicator to generate an eligible block matrix.

18. The computer-readable medium as defined in claim 17, wherein the instructions, when executed, further cause the processor to mask a detection window with the eligible block matrix, the mask to reduce a number of blocks to be processed in image classification.

19. The computer-readable medium as defined in claim 15, wherein the instructions, when executed, further cause the processor to:
convolve a ones matrix kernel to respective cells of the encoded silhouette; and
calculate a sum total of foreground cells within the ones matrix kernel for the respective cells of the encoded silhouette.

20. The computer-readable medium as defined in claim 19, wherein the instructions, when executed, further cause the processor to encode the convoluted bitmap matrix with the sum total in respective cells of the convoluted bitmap matrix.

21. The computer-readable medium as defined in claim 15, wherein the instructions, when executed, further cause the processor to set a value of the cell retention threshold based on at least one of a matrix kernel size or an overlap step size.

22. A system to analyze an image, the system comprising:
means for identifying a foreground silhouette within the image;
means for generating a bounding box based on borders of the foreground silhouette;
means for generating an encoded silhouette matrix to identify cells of a foreground and cells of a background;
means for convolving the encoded silhouette matrix to generate a convoluted bitmap matrix;
means for improving image classification efficiency by identifying eligible blocks of the convoluted bitmap matrix by (a) retaining first respective cells of the convoluted bitmap matrix that satisfy a cell retention threshold, and (b) remove second respective cells of the convoluted bitmap matrix that do not satisfy the cell retention threshold; and
means for classification to provide the retained first respective cells of the convoluted bitmap matrix to a histogram of oriented gradients classifier.

23. The system as defined in claim 22, further including means for generating a contributed blocks matrix by encoding the first respective cells of the contributed blocks matrix with a retention indicator, and encoding the second respective cells of the contributed blocks matrix with a discard indicator.

24. The system as defined in claim 23, further including means for identifying an outer perimeter of respective ones of the retention indicator to generate an eligible block matrix.

25. The system as defined in claim 24, further including means for masking a detection window with the eligible block matrix, the mask to reduce a number of blocks to be processed in image classification.

26. The system as defined in claim 22, further including means for:
convolving a ones matrix kernel to respective cells of the encoded silhouette; and
calculating a sum total of foreground cells within the ones matrix kernel for the respective cells of the encoded silhouette.

* * * * *